(12) United States Patent
Levy et al.

(10) Patent No.: US 12,651,128 B1
(45) Date of Patent: Jun. 9, 2026

(54) CONTENT RETRIEVAL BASED ON A GENERATIVE AI RESPONSE

(71) Applicant: Amazon Technologies, Inc., Seattle, WA (US)

(72) Inventors: Ran Levy, Ramat-Gan (IL); Leon Portman, Givatayim (IL)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 18/337,709

(22) Filed: Jun. 20, 2023

(51) Int. Cl.
*G06F 40/40* (2020.01)
*G06N 3/0455* (2023.01)
*G06N 3/0475* (2023.01)

(52) U.S. Cl.
CPC ........... *G06F 40/40* (2020.01); *G06N 3/0455* (2023.01); *G06N 3/0475* (2023.01)

(58) Field of Classification Search
CPC .... G06F 40/40; G06F 40/211; G06F 16/3329; G06F 16/334; G06F 16/3344; G06F 16/38; G06F 16/338; G06F 16/93; G06F 16/953; G10L 15/18; G10L 15/1815; G10L 15/22; G10L 15/32; G10L 2015/025; G06N 3/008; G06N 20/00; G06N 3/02; G06N 3/0455; G06N 3/08; G06N 3/088; G06N 3/096; G06N 5/04
See application file for complete search history.

(56) References Cited

U.S. PATENT DOCUMENTS

| | | | |
|---|---|---|---|
| 11,281,863 B2 * | 3/2022 | Keskar | G06F 40/30 |
| 2019/0172448 A1 * | 6/2019 | Monceaux | G10L 15/22 |
| 2020/0066265 A1 * | 2/2020 | Zhang | G10L 15/065 |
| 2022/0134032 A1 * | 5/2022 | Peake | G16H 10/20 |
| | | | 128/204.21 |
| 2022/0171943 A1 * | 6/2022 | Keskar | G06F 40/30 |
| 2024/0070489 A1 * | 2/2024 | Dang | G06F 16/3334 |
| 2024/0256582 A1 * | 8/2024 | Jain | G06F 16/3329 |
| 2024/0394249 A1 * | 11/2024 | Cunningham | G06F 16/2425 |
| 2025/0086206 A1 * | 3/2025 | Oyamada | G06F 40/30 |

* cited by examiner

*Primary Examiner* — Abdelali Serrou
(74) *Attorney, Agent, or Firm* — Knobbe, Martens, Olson & Bear, LLP

(57) ABSTRACT

Systems and methods are described for performing retrieval of information based on a generative AI prompt and response. A system can receive a prompt from a user, then generate a response to the prompt by using a generative AI model. The system may then determine a span of text within the response, which may be a portion of text from the response to be used as the basis for a retrieval or search with respect to one or more data repositories. The span of text, response, and prompt can be used to perform a search to retrieve results, where the span of text may be used as a search term in the search and the prompt and response may be used as context for ranking during the search. The results can be presented to the user to be compared against the prompt and response.

20 Claims, 6 Drawing Sheets

GENERATOR

Question
What are the ABC Corp. Women's Athletic Running Jogging Pants Hiking Quick Dry Zipper Pockets made from? — 106

112
108

Answer
- The ABC Corp. Women's Athletic Running Jogging Pants Hiking Quick Dry Zipper Pockets is made from a polyester and spandex blend, being 91.2% Polyester, 8.3% Spandex. — 110    114

102

RETRIEVER

Many running pants are made with polyester-spandex mixes to provide better stretch and great moisture management, whereas fabrics with high concentration of nylon are known to wick sweat faster.

116

PRODUCT DETAILS
- Drawstring closure
- Machine Wash
- [SOFT AGAINST YOUR SKIN] The workout pants contain 91.2% polyester 8.3% spandex moisture-wicking four-way stretch yoga fabric.
..

118

104

100

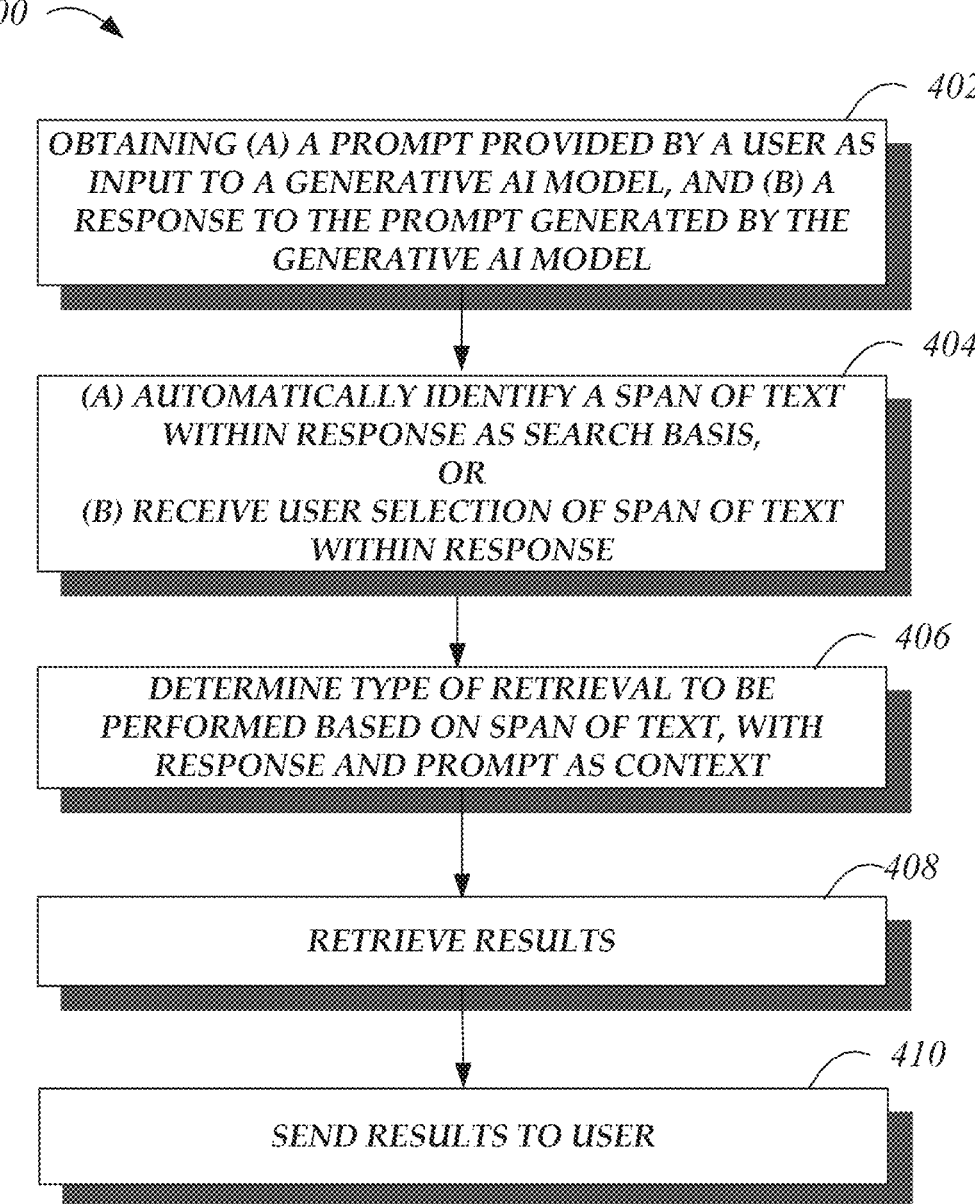

*400*

*402*

OBTAINING (A) A PROMPT PROVIDED BY A USER AS INPUT TO A GENERATIVE AI MODEL, AND (B) A RESPONSE TO THE PROMPT GENERATED BY THE GENERATIVE AI MODEL

*404*

(A) AUTOMATICALLY IDENTIFY A SPAN OF TEXT WITHIN RESPONSE AS SEARCH BASIS,
OR
(B) RECEIVE USER SELECTION OF SPAN OF TEXT WITHIN RESPONSE

*406*

DETERMINE TYPE OF RETRIEVAL TO BE PERFORMED BASED ON SPAN OF TEXT, WITH RESPONSE AND PROMPT AS CONTEXT

*408*

RETRIEVE RESULTS

*410*

SEND RESULTS TO USER

*FIG. 4*

CONTENT RETRIEVAL BASED ON A GENERATIVE AI RESPONSE

BACKGROUND

Generative artificial intelligence (AI) models or systems can be trained to generate different types of content, such as text, images, and multimedia. A trained generative AI model may receive a prompt or question from a user and then generate text as a response or answer to the prompt or question from the user. Large language models (LLMs) may be categorized as a form of generative AI that is trained on a large corpus of text or characters and provides responses to natural language prompts. Because LLMs generate the content of a response dynamically, it is not typically clear to a user whether text in an answer or response from an LLM is accurate and/or was learned by the model from trusted sources.

BRIEF DESCRIPTION OF THE DRAWINGS

Embodiments of various inventive features will now be described with reference to the following drawings. The drawings are provided to illustrate example embodiments described herein and are not intended to limit the scope of the disclosure.

FIG. 4 is a flow chart depicting an illustrative routine implemented by the question answering and retrieval system for retrieving results relevant to a span of text within an AI-generated response in accordance with embodiments of the present disclosure.

DETAILED DESCRIPTION

Figure 1:
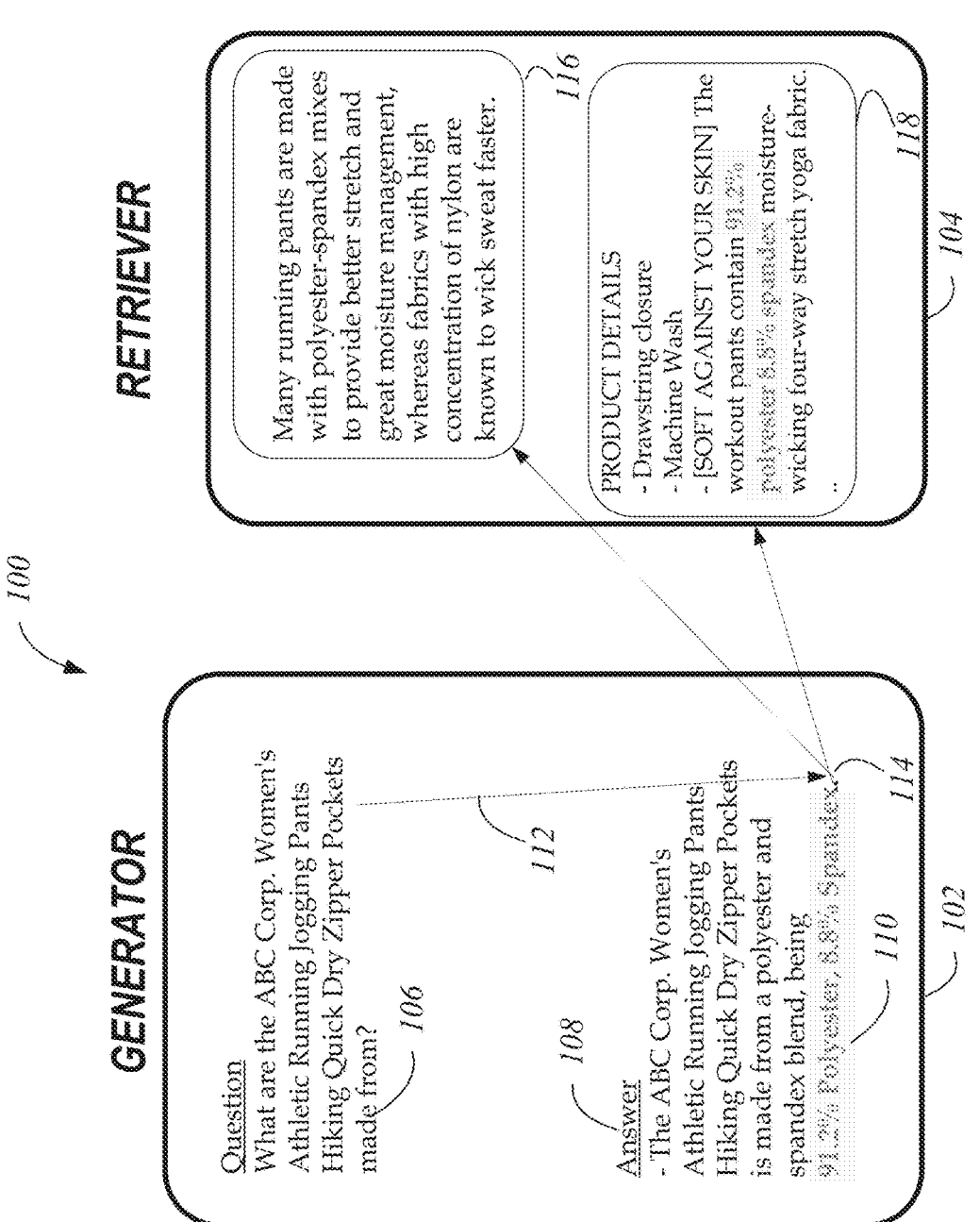
FIG. 1 illustrates a first user interface (UI) depicting a user prompt and an AI-generated response, and a second UI depicting retrieval results based at least in part on the prompt and a span within the response.

Generally described, aspects of the present disclosure relate to retrieving results based at least on a user prompt or request to a generative artificial intelligence (AI) model and the model's generative response, with particular focus on a particular span of text within the response that may be of interest to a user. Currently, generative AI such as large language models (LLMs) face many limitations. For example, due at least to the complexities of natural language, generative AI models may not understand context related to a prompt and therefore may not provide the right kind of information (or enough information) in a response. Moreover, generative AI models are known to, at times, provide inaccurate or misleading information (e.g., "hallucinate") in a response. Therefore, users may wish to be provided with more information in addition to, or providing support for, a model's generative response to the original prompt from the user.

To address at least a portion of the above-described deficiencies, a question answering and retrieval system as described herein can implement one or more modules or services to perform searches and provide results to a user to at least supplement a generative AI response. As described herein, the question answering and retrieval system can facilitate retrieving results from one or more data repositories or data sources related to a response generated by a generative AI model (e.g., an LLM). A user can provide a prompt to a generative AI model, where the generative AI model provides the user with a dynamically generated response using any of a number of known generative AI approaches, whether via an LLM or other model type. In some embodiments, the answering and retrieval system may automatically highlight a span of text within the response (e.g., a phrase or other consecutive portion of text within the response for which the user may like additional information or to verify) for the user to accept in order for the system to perform a search or retrieval based at least in part on the highlighted span of text. As described herein, a retrieval may include performing a search (e.g., searching for documents, video, webpages, multimedia, item reviews, item descriptions, question and answer entries regarding a product, etc.), database or datastore lookup (e.g., look up details of a customer or other user, look up orders of a customer, look up details of a seller of a product, etc.), dense retrieval (e.g., pulling words, sentences, or paragraphs from webpages or documents, etc.), among other types of retrievals. Alternatively, the user may manually select or highlight a span of text within the response for the answering and retrieval system to facilitate the additional search. Therefore, the answering and retrieval system may facilitate a search and provide results to function as validation of the response or provide the user with supplemental information related to the response (e.g., to learn more about a product related to the span and surrounding context of the response and prompt).

FIG. 1 illustrates a first user interface (UI) 102 depicting a user prompt 106 and an AI-generated response 108, and a second UI 104 depicting retrieval results based at least in part on the prompt and a span 110 within the response 108. As shown in FIG. 1, the first UI 102 is labelled as being produced at least in part by a generator component and the second UI 104 is labelled as being produced at least in part by a retriever component. The first UI 102 includes a prompt 106 entered by a user (e.g., as a question for a chatbot or other generative AI model), an AI-generated response 108 (which includes within it a selected span 110), prompt context 112, span and context 114, retrieval results 116, and retrieval results 118.

A user may enter prompt 106 (e.g., a question, command, request, or a combination of each) as input into the generator (e.g., which may be associated with a generative AI model such as an LLM) in order to receive a dynamically generated response (e.g., an answer to a question) from the generator. In this example, the user enters a natural language prompt (prompt 106) of "What are the ABC Corp. Women's Athletic Running Jogging Pants Hiking Quick Dry Zipper Pockets made from?" which can relate to a question concerning what kind of material particular running pants for women are made of. Depending on the training and purpose of the particular generative model utilized in a given embodiment, the generator can utilize the prompt 106 and generate (e.g., via an LLM) a response that is directed to answering a question (e.g., "how water resistant is a winter coat?") or performing an action (e.g., writing Python code) based on the prompt. As shown in FIG. 1, the generator can generate a response 108 (e.g., in this example, an answer to question 106) reading "The ABC Corp. Women's Athletic Running Jogging Pants Hiking Quick Dry Zipper Pockets is made from a polyester and spandex blend, being 91.2% Polyester, 8.8% Spandex." As shown in this response, the generator can generate a factual response of what material the running pants in question are made of. However, the user may want to know what running pants in general are usually made of, how this particular product compares to general running pants for women, whether there are sources supporting this alleged fact, and/or other related information.

Based on these and other considerations, the question answering and retrieval system can facilitate selecting or highlighting a span of text in the response to assist the user in performing a retrieval regarding the response 108. For example, the question answering and retrieval system can perform a retrieval process in an automated manner by automatically identifying a span of text of potential interest to the user, such as span 110 in this example (e.g., via a different machine learning model from the generator, or the same machine learning model as the generator). In some embodiments, the question answering and retrieval system can automatically identify span 110 as the potential span of interest based on context determined from the prompt 106 and/or response 108. As shown in FIG. 1, the question answering and retrieval system may determine that, because the prompt relates to the materials running pants are made from and the response includes generated text describing those materials, the span 110 should highlight just the percentages of materials that the pants are made from instead of the whole text of the response 108.

In other examples, the question answering and retrieval system may select a span of text to assist a user in performing product discovery (e.g., to give the user more information on what running pants are made of and give a user a product description of those pants with the materials highlighted). In other examples, the question answering and retrieval system may select a span of text to assist a user in performing product comparison (e.g., to ask the retriever model to retrieve product comparisons of the product prompted on and other products in the same category). In other examples, the question answering and retrieval system may select a span of text to assist a user in performing a specific order lookup of an order just placed by the generator module (e.g., the prompt to the generator module may be a request to order running pants, where the generator responds that the order was placed but the user may want to confirm the order was placed via the retrieval module to retrieve the actual order to confirm it was placed).

According to some embodiments, the span 110 may represent a subset of the full text of response 108, where that subset is a phrase or other consecutive set of characters/words which a component of the question answering and retrieval system has determined may be of particular interest to a user/reader of the answer 108 as a search term or other basis for retrieving additional text from existing sources (such as one or more data repositories or other non-generative sources). As another example according to some embodiments, the user may manually select the span 110 to serve as the primary basis for the retrieval process, or may modify which portion of text of answer 108 to highlight by modifying the start and/or end point of highlighting/selection relative to that of an automatically generated initial highlighted span of text.

As shown in FIG. 1, the question answering and retrieval system can then utilize the span 110, with prompt 106 and the remainder of the response 108 as context, to initiate a search to produce results for the user to review with the prompt 106. For example, the answering and retrieval system may provide to the retriever component, the span 110 (with prompt 106 and the other text of response 108 as context, as will be discussed further below) as an input span and context 114 for the retriever to perform a search of one or more data repositories or data sources. The answering and retrieval system may determine that the search performed by the retriever should retrieve results 116 to describe what running pants are made of generally because the prompt 106 was a question regarding running pants material, the response 108 provided a paragraph describing the materials that the running pants were made from, and the span 110 specifically highlighted the percentages of the materials that the pants are made from. The retriever may then place the results 116 of the search in the second UI 104 as "Many running pants are made with polyester-spandex mixes to provide better stretch and great moisture management, whereas fabrics with high concentration of nylon are known to wick sweat faster." The answering and retrieval system may use the retriever to retrieve multiple forms of results to satisfy the user's selection of the span (e.g., parts of files in a repository with a link to the files, select text or paragraphs of webpages and/or links to the webpages, such as a product page provided by a manufacturer, links to videos or other multimedia describing a product or covering reviews of the product, etc.).

Additionally, or alternatively, the answering and retrieval system may determine with span and context 114, that in addition to providing the results 116 (e.g., describing what running pants are generally made of), the user may also like to see product details (e.g., this could be a website for the product at the product's manufacturer website or product page on a retail website, reviews from a technology publication, specific user reviews, etc.) of the running pants which include what materials the pants are made from (e.g., for the user to compare against what running pants are typically made from generally). Therefore, the answering and retrieval system may direct the retriever component to retrieve the product details (e.g., from the different sources above, such as a website or entry in an electronic catalog, etc.) of the running pants as shown in results 118, where the materials which the running pants are made from may be highlighted. As such, the user may use second UI 104 to perform further research or validation regarding the running pants after the user received the generated response 108.

Figure 2:
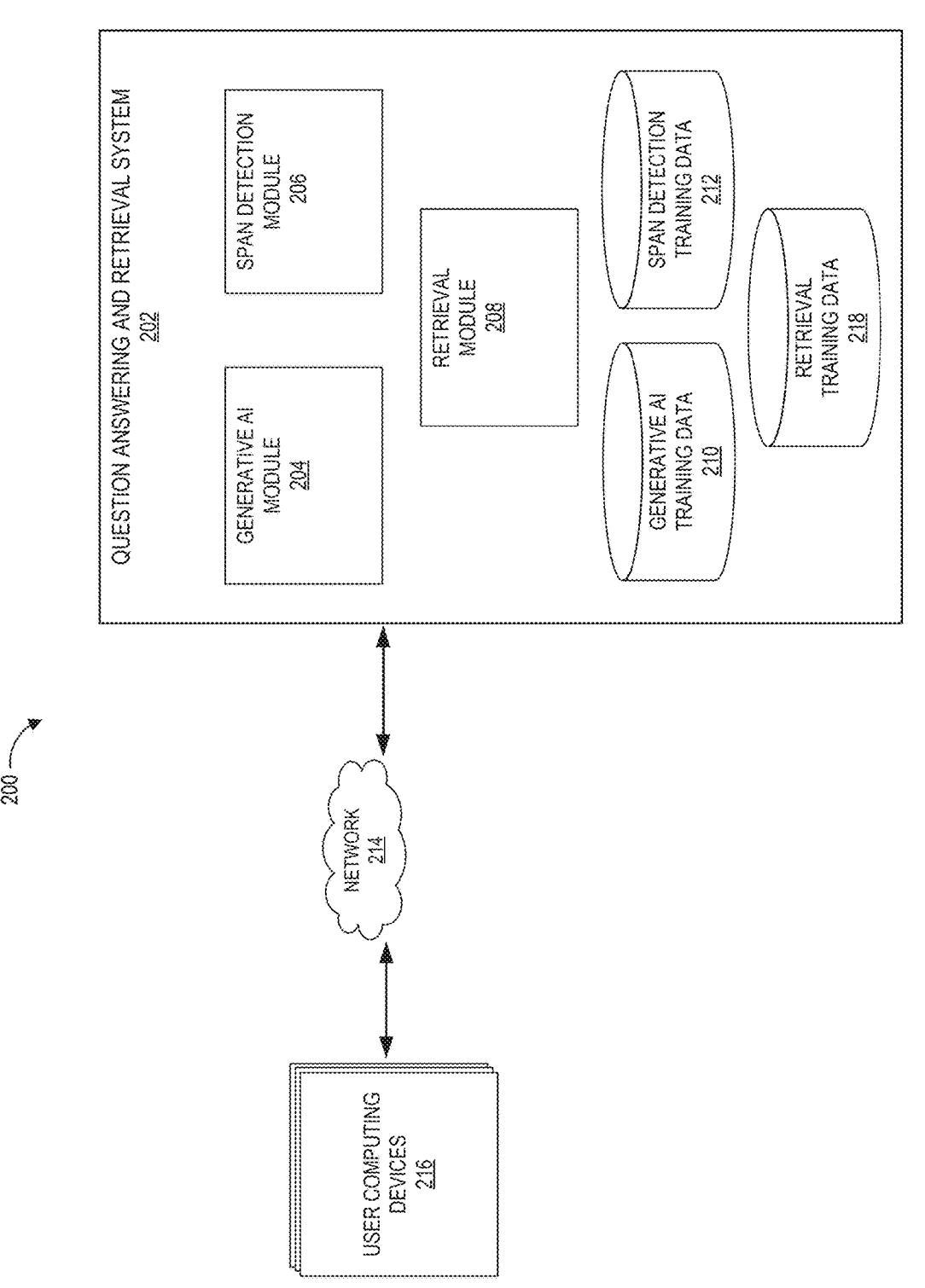
FIG. 2 depicts an example environment in which user computing devices and a question answering and retrieval system can interact to generate generative AI responses and retrieval results in accordance with embodiments of the present disclosure.

FIG. 2 depicts an example environment 200 in which user computing devices 216 and a question answering and retrieval system 202 can interact to generate generative AI responses and retrieval results in accordance with embodiments of the present disclosure. The question answering and retrieval system 202 can illustratively be accessed by user computing devices 216 over a network 214.

The network 214 can include any appropriate network, including an intranet, the Internet, a cellular network, a local area network or any other such network or combination thereof. In FIG. 2, the network 214 can be the Internet. Protocols and components for communicating via the Internet or any of the other aforementioned types of communication networks are known to those skilled in the art of computer communications and thus, need not be described in more detail herein.

User computing devices 216 can include any network-equipped computing device, for example desktop computers, laptops, smartphones, tablets, e-readers, set top boxes, virtual reality headsets, gaming consoles, and the like. A user of the user computing devices 216 can interact (e.g., via a UI of the user computing devices 216) with the question answering and retrieval system 202 over the network 214 in order for the question answering and retrieval system 202 to facilitate a generative AI model response to a prompt and facilitate a retrieval based on a span (e.g., a portion of text within the response) and associated context (e.g., other surrounding text of the response and/or text of the prompt).

The question answering and retrieval system 202 may illustratively include a generative AI module 204 that can receive a prompt from a user of the user computing devices 216 and generate a response (e.g., the response can include performing a command such as ordering a product, etc.). For example, the generative AI module 204 may be associated with a generative AI model such as an LLM that may receive natural language as a prompt. Furthermore, the generative AI module 204 may be associated with a generative AI model that is trained on a large corpus of text, images, and/or multimedia associated with the broad internet. Alternatively, or additionally, the generative AI module 204 may be associated with a generative AI model that is trained on a large corpus of text, images, and/or multimedia associated with specific domain, such as a retail shopping company that sells physical products and services (e.g., pants, shoes, TV repair, books, etc.). Therefore, if the generative AI module 204 is associated with a specific domain, such module may be trained to answer questions concerning that domain but not others (e.g., a generative AI model with corpus based on retail products may not be able to accurately answer prompts concerning real estate questions but can provide better responses concerning retail products). Moreover, the generative AI model may use retrieval augmented generation (RAG) techniques to generate responses utilizing access to Internet-accessible documents and other types of information that a RAG model may have access to.

It should be noted that, in some embodiments, the generative AI module 204 may be implemented outside of the question answering and retrieval system 202, such that the question answering and retrieval system 202 may receive a prompt and response through another system (e.g., via an application programming interface (API) call). It will be appreciated that because some embodiments of the span detection module 206 and retrieval module 208 may be agnostic as to the particular type of generative AI module 204 or the data on which the generative AI module 204 may be trained, a retrieval system implementing the span detection module 206 and retrieval module 208 may operate independently of a separate question answering system (that includes the generative AI module 204) and merely receive the text of the prompt and generated response of the generative AI module 204 without any additional information regarding how the generated response was generated. Thus, the generative AI module 204 may be trained in a number of known manners (either by the operator of the modules 206 and 208, or by a separate third-party entity) using various types of training data (e.g., training dataset) without necessarily requiring corresponding changes or customizations to the span detection module 206 and/or retrieval module 208.

The question answering and retrieval system 202 may illustratively include span detection module 206 which can automatically detect a span of text within a response from the generative AI module 204 or allow the user to manually select a span of text within the response. As stated herein, the span detection module 206 may automatically determine a span of text to highlight within the response from the generative AI module 204 based on the prompt, the response, and other factors. In some examples, the span detection module 206 may automatically determine a span of text within the response by highlighting or selecting text in a response that the generative AI module 204 determined was below a confidence threshold score (e.g., had the least amount of confidence that the group of text within the response was accurate or not "hallucinated" by the model as compared to other text or groups of text within the response). In another example, the span detection module 206 may automatically determine a span of text within the response by highlighting or selecting text in a response that the generative AI module 204 determined had an amount of uncertainty as to whether the text belonged in the response.

Additionally, or alternatively, the user may manually select the span of text from within the response. In other examples, the user may manually modify which portion of response text that is initially highlighted, as an automatically selected span, to their desired text portion of the response. The span detection module 206 may be implemented as an algorithm such as a machine learning algorithm trained on previously used prompts, responses, and spans of text (e.g., whether selected automatically or manually), as will be further described below. It should be noted that the generative span detection module 206 may be implemented outside of the question answering and retrieval system 202 such that the question answering and retrieval system 202 may receive span detection information through another system or service (e.g., via an API call).

The question answering and retrieval system 202 illustratively includes a retrieval module 208 that can retrieve results based on a span of text, prompt, and response. The retrieval module 208 may receive the span of text from the span detection module 206 and context information (e.g., prompt and response generated by the generative AI module 204) from the generative AI module 204. The retrieval module 208 may determine a type of retrieval to perform based on ranking (e.g., highest or lowest ranking, etc.) the span of text and the context information, which may be further based on other previous spans of text and context information that are similar or dissimilar. Additionally, the span of text may be based on session context of a user using the generative AI module 204 (e.g., the user makes multiple prompts and receives multiple responses in one session, etc.). For example, session context may include a series of prompts and responses in the same chat session between the user and the generative AI module, and/or may include information regarding the particular service or page from which the user initiated a prompt or otherwise recently viewed. Once the retrieval module 208 retrieves search results, the question answering and retrieval system 202 can present those results to the user in different ways. The question answering and retrieval system 202 may present the search results to the user in a same UI window as the prompt and response generated by the generative AI module 204 or in a separate UI window, or using other methods (e.g., inline citing, audio response, attachment file, etc.). The retrieval module 208 may be implemented using a machine learning algorithm or model trained on previously retrieved search results. It should be noted that the generative AI module 204 may be implemented outside of the question answering and retrieval system 202 such that the question answering and retrieval system 202 may receive a prompt and response through another system (e.g., via an application programming interface (API) call), as discussed above. Moreover, the retrieval module 208 may use RAG techniques to retrieve results utilizing access to documents and other types of information that a RAG model may have access to.

The question answering and retrieval system 202 illustratively may include generative AI training data 210 which may be a data store of training data which can correspond to any persistent or substantially persistent storage, such as a solid-state storage, a disk drive, network attached storage, or the like. For example, the generative AI training data 210 data store may store training data which was obtained or sourced from a large corpus of text, images, and multimedia in order to allow the generative AI module 204 the ability to generate responses to prompts. In other embodiments, the generative AI training data 210 may be trained on the whole Internet or a specific domain of data (e.g., a retail store that sells goods and services). In some embodiments, the AI training data 210 may optionally be used for an additional purpose as grounding data for the retrieval process described herein, as performed by the retrieval module 208. As discussed above, it will be appreciated that the generative AI module 204 may operate independently from the span detection module 206 and retrieval module 208, such that novel aspects of the modules 204 and 206 described herein are independent of the generative AI module's specific operation and training details. However, in some embodiments, the data sources and repositories searched by the retrieval module 208 may relate to or overlap with data sources on which the generative AI module 204 was trained (e.g., in embodiments in which a potential interest of users is expected to be verification or understanding of the potential source or reasons that the generative AI module 204 generated a particular portion of a generative response).

The question answering and retrieval system 202 illustratively may include span detection training data 212 which may be a data store of training data which can correspond to any persistent or substantially persistent storage, such as a solid-state storage, a disk drive, network attached storage, or the like. For example, the span detection training data 212 data store may store training data which was determined from prior automatic or manual span detections of prior spans of text and context information (e.g., prompts and responses) to allow the span detection module 206 the ability to automatically select or highlight spans of texts within a response. For example, the span detection training data 212 may include indications of previously detected or labeled spans and corresponding previous prompts and generated responses. In the case of previous user-selected spans serving as training data for span detection, such training data may enable the span detection module 206 to learn the types of spans that have been of particular interest to users in thousands of previous instances. In the case of previously automatically identified spans serving as training data for span detection, the training data may further include user feedback data indicating whether users found the particular spans and/or the corresponding retrieval results valuable (e.g., thumbs up or thumbs down approval, comments, etc.), helpful or interesting in the past instances, for example.

The question answering and retrieval system 202 illustratively may include retrieval training data 218 which may be a data store of training data which can correspond to any persistent or substantially persistent storage, such as a solid-state storage, a disk drive, network attached storage, or the like. For example, the retrieval training data 218 data store may store training data which was trained on prior retrieved searches based on spans of text, prompts, and responses to allow the retrieval module 208 the ability to determine the type of search to perform based on a span, prompt, and response. In other embodiments, the retrieval training data 218 may not be needed, such as in instances where the retrieval module 208 is configured to conduct a search or retrieval of data from a predetermined repository or data source, such that no dynamic selection of the particular data set to search is required.

Figure 3:
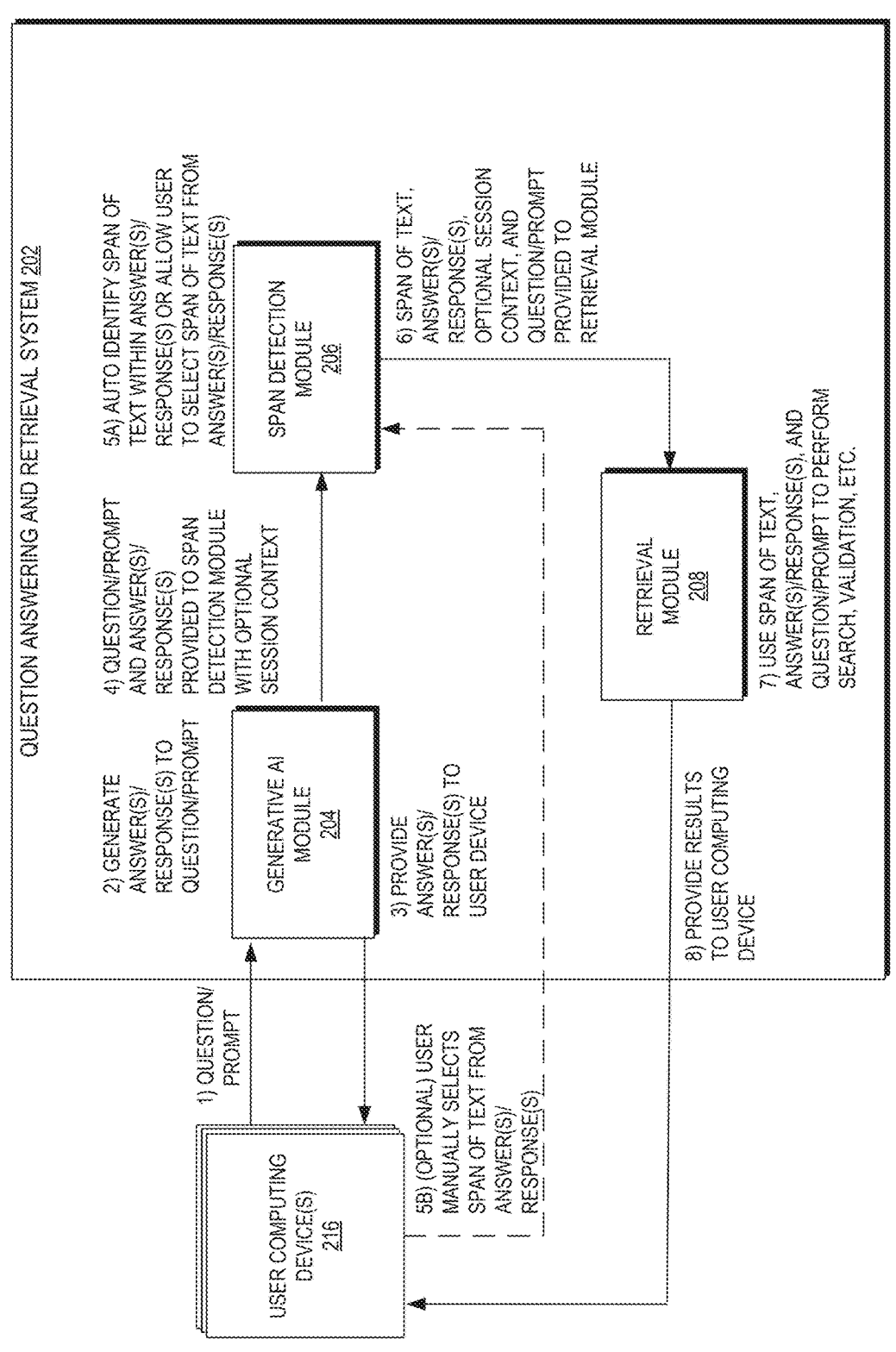
FIG. 3 depicts illustrative interactions for utilizing the question answering and retrieval system to retrieve results relevant to a span of text within an AI-generated response, in accordance with embodiments of the present disclosure.

FIG. 3 depicts illustrative interactions for generating search results based on a span of text and associated context (e.g., determined from a prompt and text of the response other than the span of interest), in accordance with embodiments of the present disclosure. The interactions begin at (1), where a user of one of the user computing devices 216 submits a prompt (e.g., a question about a product, a command to compare products, a command to order a product, a command to write code in a computer programming language, etc.). For example, the prompt may be entered by the user as text typed by the user or as audio data (e.g., spoken by the user and captured by a microphone of the user's device) that is converted to text content via known speech recognition methods.

At (2), the generative AI module 204 generates a response (e.g., answer to a question, indication that a task requested for in the prompt was completed, etc.) to the prompt. As described herein, the generative AI module 204 may employ an LLM or other generative AI model that is trained on a corpus of text, images, and/or multimedia, which may include data from the whole Internet. Additionally, or alternatively, the generative AI module 204 may be a generative AI model (e.g., LLM) that is trained on a corpus of text, images, and multimedia comprising a specific domain (e.g., products or services of a retail website). It should also be noted that, in some embodiments, the generative AI module 204 may be implemented separately from the question answering and retrieval system 202 and may be in communication with the question answering and retrieval system 202 via APIs, as discussed above.

At (3), the generative AI module 204 provides the response to the user. For example, this response may be presented to the user on a first UI presented by the user computing device 216, which may be the same UI where the user input the prompt. At (4), the generative AI module 204 sends the prompt and response to the span detection module 206 for span detection automatically or manually by the user. Optionally, the generative AI module 204 may send session context to the span detection module 206. For example, session context may include multiple prompts (e.g., from the user) and responses (e.g., by the generative AI module 204) from a single session between a user and the generative AI module 204.

At (5A), the span detection module 206 receives the prompt, response, and other data (e.g., session context) from the generative AI module 204, and automatically identifies a span of text within the response or allows the user to manually select the span of text within the response. The span detection module 206 may automatically identify a span of text within the response to select or highlight by utilizing confidence scores generated from the generative AI module 204, and selecting a span of text with scores lower than a threshold. In this example, the generative AI module 204 may determine confidence scores for different parts of a response it generated. In other words, the generative AI module 204 may generate a first confidence score for a first part of the response and a second and a different confidence score as a second confidence score (e.g., out a confidence of 0-100, 100 being the most confident, the first three words of a response is given a score of 40, and the last 10 words of the response are given a score of 75). As such, the span detection module 206 may identify scores related to a span of text lower than a certain threshold score (e.g., choose scores of lower than 50 which may mean low than a 50% confidence level) to be selected or highlighted because the generative AI module 204 didn't meet a certain threshold of confidence and the user may want to perform a search focused on that portion of the response (e.g., to learn more information regarding concepts associated with the span of text, to verify that the span of text is accurate or valid in relation to the prompt and response as a whole, etc.).

The span detection module 206 may automatically identify a span of text within the response to select or highlight by determining that certain texts or group of texts within a response that needs verification determined by the generative AI module 204. For example, the generative AI module 204 may be trained to identify certain patterns of text or groups of text that consistently are flagged for verification (e.g., consistently flag group of text starting with superlatives like "all." "never." and "best." etc.) and therefore the span detection module 206 may select or highlight that span of text within the response. In another example, the generative AI module 204 may be trained to surround uncertain parts of a response with special tags (e.g., <VERIFY> this text needs verification </VERIFY>) by corrupting some span of text within a response thereby surrounding the span of text with tags (e.g., "the 4th of July is the independence day of the United States" could be corrupted to "<VERIFY> The 5th of July </VERIFY> is the independence day of the United States").

Still at 5(A), in some embodiments, span detection module 206 may automatically identify a span of text within the response to select or highlight by using weak supervision to train a machine learning (ML) used to identify a span of text within a response. In this example, the span detection module 206 may use weak labels in spans in the current response such that they are relatively unique when compared against a large set of responses. In such an embodiment, the span detection module 206 may utilize Term Frequency-Inverse Document Frequency (TF-IDF) using frequency of words from a response to determine how relevant those words are when compared to a large set of responses generated by the generative AI module 204. For example, terms or strings of words that are relatively uncommon in responses or in a larger data set (e.g., the entire Internet or other data source) may be of more interest to a user for further research or reading because such terms may be particular to a topic of the prompt and/or less familiar to the reader than common terms/phrases.

In another example, the span detection module 206 may automatically identify a span of text within the response to select or highlight by using a trained data set to identify a span of text within a response. The span detection module 206 may utilize the trained data set to identify patterns of prior prompts, responses, and spans such that the span detection module 206 may input a current prompt and response and be given a predictive span from within the response (e.g., prompts regarding questions about multiple items like winter jackets, usually result in responses providing answers about each item, where spans usually highlight each item for a comparison chart to be produced via a retrieval module).

At (5B), which is an optional step, the user manually selects a span of text within the response for search by the retrieval module 208. Alternatively, or additionally, the user may modify which portion of the response is highlighted based on an automatic span of text selection or highlight by the span detection module 206. For example, the user may agree partly with the automatic span selection but may want to make tweaks to which words are selected as the span of text (e.g., adding more or less of the text of the response as the span for search).

At (6), the span of text, response, prompt, and optional session context are sent to the retrieval module 208 for the retrieval module 208 to perform a search and retrieve results. In some embodiments, the span, the full response and the prompt may be provided to the retrieval module without modification, such that the retrieval module may use the span as the basis for a retrieval, then sort results based on context determined from the full response and/or prompt (e.g., based in part on determinations of relevant contextual text that is determined using TF-IDF and/or other textual analysis). In other embodiments, the span detection module 206, the retrieval module 208, or another intermediary module may generate a vector or embedding that represents a combination of the span and surrounding context (e.g., context from the prompt and/or text from the response other than the span itself). For example, the system 202 may generate an embedding as input to the retrieval module 208, where the embedding is generated primarily based on the span, with surrounding text of the response and/or the prompt represented but weighted less in the embedding process. In other embodiments, a query embedding may be generated based only on the span, and a separate context embedding may be generated based on the full response and prompt.

At (7), the retrieval module 208 uses the span of text, response, optional session context, and prompt to perform a retrieval and retrieve results. As discussed above, depending on the embodiment, the retrieval module 208 may use the span, response, optional session context, and prompt text directly as input for a search, or may utilize one or more embeddings or vector representations generated as discussed above as a basis for the search/retrieval process. The retrieval module 208 may determine a type of retrieval to perform based on ranking the span of text and the context information relative to other spans of text and context information that are similar or dissimilar. For example, the retrieval module 208 may rank the span of text and context information (prompt and response) and determine that the span and context information have a similar ranking with other spans and contexts where the type of search is to search for or generate a comparison chart of products (e.g., spans that usually highlight two or more products within same category, such as hairbrushes, and context relates to question and answers regarding similarities and differences between the products).

In another example, the retrieval module 208 may rank the span of text and context information and determine that the span and context information have a similar ranking with other spans and contexts where the type of search is to provide information regarding a brand or entity (e.g., spans that usually highlight a name of a company, and context relates to question and answers regarding information about a product or service from that company). In another example, the retrieval module 208 may rank the span of text and context information and determine that the span and context information have a similar ranking with other spans and contexts where the type of search is to provide a definition of a word or concept (e.g., spans that usually highlight a single word, like "VoIP," and context relates to question and answers regarding information about a product where the highlighted word is listed as a feature of that product).

Moreover, the retrieval module 208 may utilize the session context along with the span, prompt, and response to perform a retrieval. For example, the retrieval module 208 may use session context to refine the retrieval (e.g., a first prompt is regarding a comparison of three gaming laptops, a first response is a comparison of three gaming laptops, a subsequent prompt is concerning the third laptop and a subsequent response is regarding the third laptop) to retrieve specific results taking into account the session context (e.g., subsequent prompt asks if a graphics processing unit (GPU) of the third laptop is good, subsequent response provides an answer that says the GPU is good but does not provide GPU details, the span of text highlights the GPU text in the response, and the retrieval module 208 knows from the session context to only pull GPU information for the third laptop and consider it in the context of gaming computers specifically). It should also be noted that, in some embodiments, the span retrieval module 208 may be implemented separately from the question answering and retrieval system 202 and may be in communication with the question answering and retrieval system 202 via APIs.

At (8), the retrieval module 208 provides the results of the search performed at (7) to the user of the user computing device 216. The results may be provided in the same UI on the user computing device 216 as the prompt and response (e.g., in a part of the same window, or provided inline as a sub-window, etc.). Alternatively, or additionally, the results may be provided in a different UI from the prompt and response (e.g., prompt and response are in a first UI and the results are provided in a second UI). Alternatively, or additionally, the results may be provided as an attachment (e.g., sent via email or via an API to the user). Alternatively, or additionally, the results may be provided to the users in a second UI with other results as a part of an ongoing multi-turn retrieval session.

Accordingly, a user computing device 216 can, via the interactions of FIG. 3, be provided a response to a prompt via the question answering and retrieval system 202, and then be provided search results related to a span selected from within the response (with the prompt and response as context). The user computing device 216 may thereafter display the results in the same or different UI window as the prompt and response, such that a user of the user computing device 216 may research or validate a response.

FIG. 4 is a flow chart depicting an illustrative routine 400 implemented by the question answering and retrieval system for retrieving results relevant to a span of text within an AI-generated response in accordance with embodiments of the present disclosure. The routine 400 begins at block 402, where the question answering and retrieval system 202 obtains (a) a prompt provided by a user input to a generative AI model, and (b) a response to the prompt generated by the generative AI model. It should be noted that the question answering and retrieval system 202 may also receive session context, as discussed above. As described herein, the generative AI module 204 may be operated separately from question answering and retrieval system 202. Therefore, the question answering and retrieval system 202 may be implemented on a specific domain (e.g., a product or service retail website), where the question answering and retrieval system 202 receives prompts (e.g., from user devices) and responses (e.g., from one or more external systems with their own generative AI models) regarding products or services specific to that domain.

At block 404, the question answering and retrieval system 202 may automatically identify a span of text (e.g., a portion of text of potential interest to the user as a search basis) within the response, which may be based in part on context determined from text of the prompt, response, and optional session context. As previously described, the span of text may be identified by determined confidence scores of text in the response by a generative AI model. The span of text may also or alternatively be identified by determining text in the response that may need to be verified. Moreover, the span of text may be identified using weak supervision to train a ML model or other methods described above. Additionally, the span of text may be determined or refined by session context.

At block 406, the question answering and retrieval system 202 determines the type of retrieval to be performed, or sources to be searched, based on the span and context (prompt and response). As stated herein, the question answering and retrieval system 202 may determine a type of retrieval to perform based on ranking the span of text and the context information to other spans of text and context information that are similar or dissimilar, and optional session context. For example, the question answering and retrieval system 202 may rank the span of text and context information and determine that the span and context information have a similar ranking with other spans and contexts where the type of search is to search for or generate a comparison chart of products (e.g., such spans usually highlight two or more products within the same category, such as hairbrushes, and context relates to question and answers regarding similarities and differences between the products). The type of search may vary depending on the embodiment and the intent of the user in using the question answering and retrieval system 202, as will be understood from the variety of examples described herein.

At block 408, the question answering and retrieval system 202 retrieves the results based on the type of retrieval determined at 406. The retrieval may be from specific domain repositories for an entity or company (e.g., domain for a retail website offering products and services). Additionally, or alternatively, the retrieval may be from the general internet or general search indexes (e.g., passages or parts of a product website, product review page, retail page, etc.). At block 410, the question answering and retrieval system 202 sends the results to the network 214. As described herein, the results may be displayed or presented in a first UI along with the prompt and response or in a second UI separate from the prompt and response. It will be appreciated that more than one result may be provided to the user, such as the top results for the searched query term and the given context (e.g., search results using the span as a query string, with results ranked by context determined from the prompt and AI-generated response).

While FIG. 4 is described with reference to operation of a question answering and retrieval system 202, in some embodiments the routine 400 may be implemented in whole or in part by another device, such as a user computing device 216.

Figure 5:
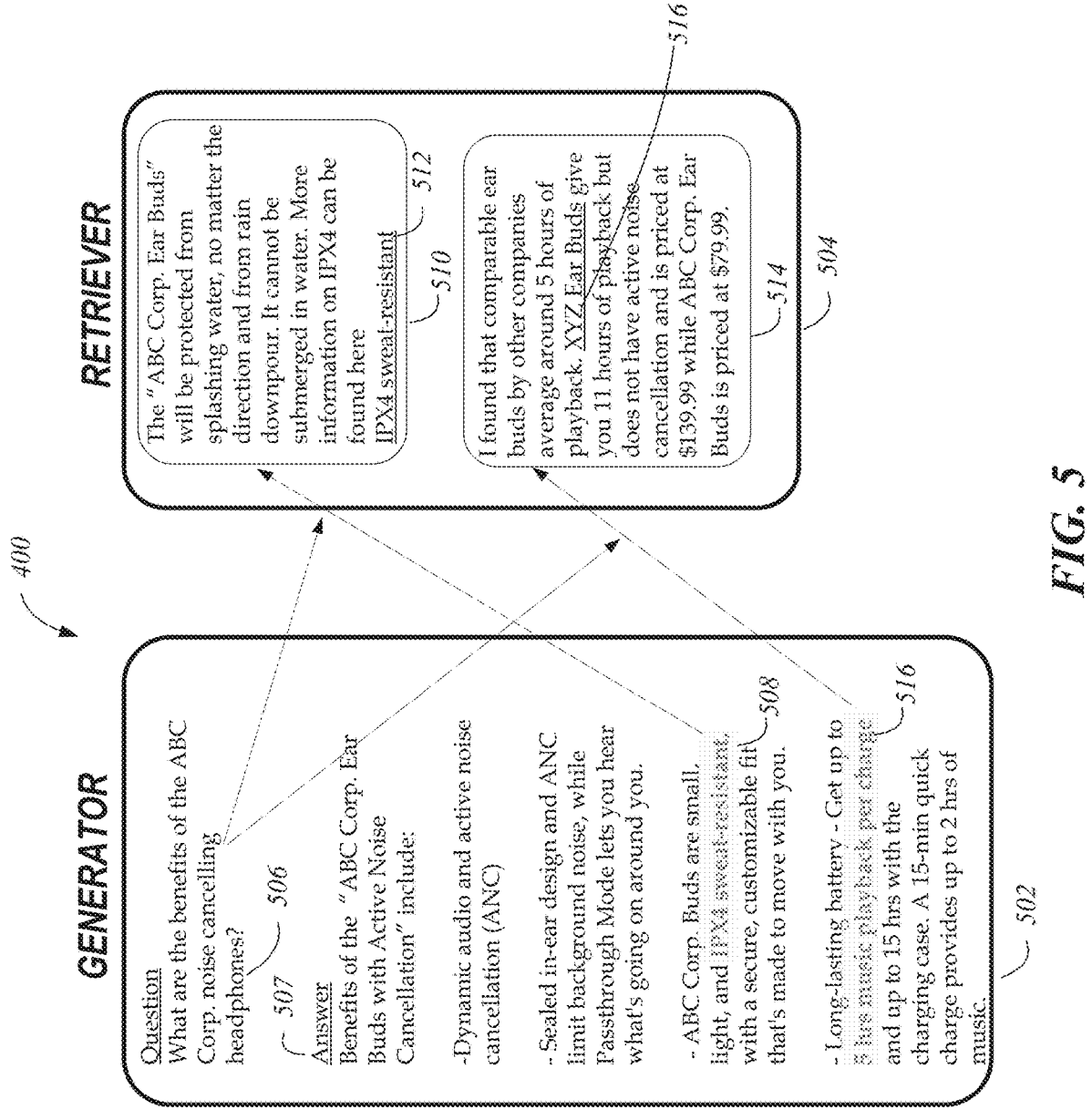
FIG. 5 illustrates a third UI depicting a user prompt and AI-generated response, and a fourth UI depicting retrieval results based on at least in part on the prompt and a span of text within the response.

FIG. 5 illustrates a first user interface (UI) 502 depicting a prompt 506, response 507, span 508 and span 516. FIG. 5 also illustrates a second UI 504 (which may be displayed in a second portion of the same UI 502) depicting retrieval results based on the spans 508 and/or 516, prompt 506, and response 507 as facilitated by the question answering and retrieval system 202. A user may enter prompt 506 into the generator (e.g., which may be associated with a generative AI model such as an LLM) in order to receive a response (e.g., an answer to a question) from the generator. In this example, the user enters a natural language prompt (prompt 506) of "What are the benefits of the ABC Corp. noise cancelling headphones?" which can relate to a question regarding the benefits of a certain brand of headphones. The generator can utilize the prompt 506 and generate (e.g., via an LLM) a response that is directed to answering a question (e.g., benefits of a product) or performing an action (e.g., creating a drawing with some limited input) based on the prompt.

As shown in FIG. 5, the generator can generate a response 507 (e.g., in this example an answer to a question) reading "Benefits of the "ABC Corp. Ear Buds with Active Noise Cancellation" include: —Dynamic audio and active noise cancellation (ANC)—Sealed in-car design and ANC limit background noise, while Passthrough Mode lets you hear what's going on around you. —ABC Corp. Buds are small, light, and IPX4 sweat-resistant, with a secure, customizable fit that's made to move with you. —Long-lasting battery—Get up to 5 hrs music playback per charge and up to 15 hrs with the charging case. A 15-min quick charge provides up to 2 hrs of music." As shown in this response, the generator can generate a response regarding the benefits of a specific headphone product. However, the user may want to know what a water resistance term is and also how the hours of playback compare to other headphones in the same category and/or price range.

Therefore, the question answering and retrieval system 202 can facilitate selecting or highlighting spans of text in the response to assist the user in performing a retrieval search regarding the response 507. For example, the question answering and retrieval system can perform this facilitation in an automated matter by automatically identifying a span of text of potential user interest as span 508 (e.g., via a different machine learning model from the generator, or the same machine learning model as the generator), such as using techniques described above. As shown in FIG. 5, the question answering and retrieval system may determine that, because the prompt relates to headphones and the response includes a non-layman's term regarding water resistance, the span 508 should highlight the water resistance term (which may be determined at least in part by applying TF-IDF techniques or others to identify the relative uncommon term "IPX4"). As another example, the question answering and retrieval system can perform this facilitation in an automated matter by automatically identifying a span of text in span 516 (e.g., via a different machine learning model from the generator, or the same machine learning model as the generator) which the question answering and retrieval system can automatically identify by using the prompt, response, and optional session context. As shown in FIG. 5, the question answering and retrieval system may determine that, because the prompt relates to headphones and the response includes hours of playback which is identified as commonly searched for information by other users, the span 516 should highlight the hours of playback. As another example, the user may manually select the spans 508 or 516 as a basis for the system to perform a search.

As shown in FIG. 5, the question answering and retrieval system can then utilize the spans, with prompt 506 and the response 507 as context, to initiate retrievals to produce results for the user to review with the prompt 506 and response 507, as described above. The answering and retrieval system 202 may determine that the type of retrieval to be performed (e.g., based on one of the described methods above) by the retriever should be to retrieve results 512 (e.g., could be extracted from or reference to a product webpage by the manufacturer or retail website that sells this product) to describe the term "IPX4 sweat-resistant" because the prompt 506 was a question of the benefits of the headphones, the response 507 listed those benefits, and the span 508 specifically highlighted water resistance term. In such an example, the system may determine that the data repositories to search should include an electronic catalog (e.g., to identify product details or attributes from a product listing for the product), user reviews for one or more products, and/or other sources. The retriever may then place the results 510 (e.g., describing the water resistance of the headphones) of the search in the second UI 504 with a link 512 (e.g., link to a standards setting body, like the International Organization for Standardization (ISO), which describes the water resistance, etc.) describing the water resistance in more detail.

As another example, the answering and retrieval system may provide to the retriever, the span 516 with prompt 506 and response 507 as context. The answering and retrieval system 202 may determine that the type of retrieval to be performed (e.g., based on one of the described methods above) by the retriever should be to retrieve results 514 (e.g., a technical review by a technical magazine or a written user review or a video review, etc.) that discusses a comparison of hours of playback of other headphones comparable to the headphones in the prompt because the prompt 506 was a question regarding the benefits of the headphones, the response 507 listed those benefits, and the span 516 specifically highlighted the hours of playback of the headphones. The retriever may then place the results 514 (e.g., discussing the average hours of playback of competitor headphones and also a headphone which offers substantially longer playback but has potential shortcomings) of the retrieval in the second UI 504 with a link 516 to the competitor headphones with longer hours of playback (but which costs substantially more and doesn't have noise cancelling). As such, the user may use second UI 504 to perform further research (or validation) regarding the headphones after the user received the response 507.

Figure 6:
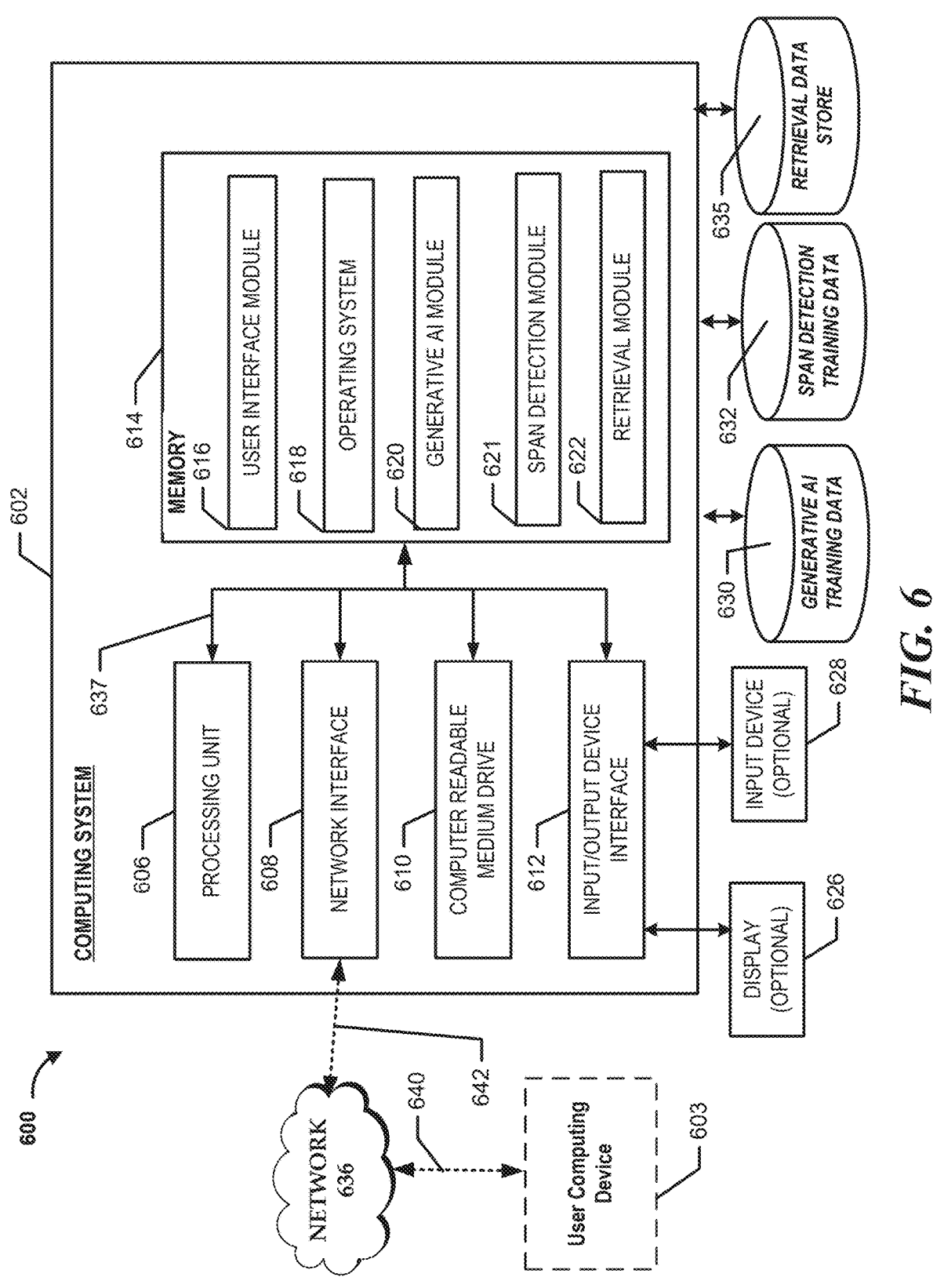
FIG. 6 depicts a general architecture of a computing system configured to implement aspects of the present disclosure.

FIG. 6 illustrates a general architecture of a computing environment 600 that may be used to implement aspects of the present disclosure, according to some embodiments. As depicted in FIG. 6, the computing environment 600 may include a computing system 602. The general architecture of the computing system 602 may include an arrangement of computer hardware and software components used to implement aspects of the present disclosure. The computing system 602 may include many more (or fewer) elements than those shown in FIG. 6. In some embodiments, the computing system 602 may be an example of, or at least part of, a question answering and retrieval system as described above.

As illustrated, the computing system 602 includes a processing unit 606, a network interface 608, a computer readable medium drive 610, an input/output device interface 612, an optional display 626, and an optional input device 628, all of which may communicate with one another by way of a communication bus 637. The processing unit 606 may communicate to and from memory 614 and may provide output information for the optional display 626 via the input/output device interface 612. The input/output device interface 612 may also accept input from the optional input device 628, such as a keyboard, mouse, digital pen, microphone, touch screen, gesture recognition system, voice recognition system, or other input device known in the art.

The memory 614 may contain computer program instructions (grouped as modules or components in some embodiments) that the processing unit 606 may execute in order to implement one or more embodiments described herein. The memory 614 may generally include RAM, ROM and/or other persistent, auxiliary or non-transitory computer-readable media. The memory 614 may store an operating system 618 that provides computer program instructions for use by the processing unit 606 in the general administration and operation of the computing system 602. The memory 614 may further include computer program instructions and other information for implementing aspects of the present disclosure. For example, in one embodiment, the memory 614 may include a generative AI module 620 that may generate a response based on a prompt, such as after being trained using data store 630. In another example, the memory 614 may include a span detection module 621 that may identify a span of text within the response, such as after being trained using data store 632. In another example, the memory 614 may include a retrieval module 622 that may retrieve results based on the span, response, and prompt, such as from data store 635 or other internal or external data source or repository.

In some embodiments, the network interface 608 may provide connectivity to one or more networks or computing systems, and the processing unit 606 may receive information and instructions from other computing systems or services via one or more networks. In the example illustrated in FIG. 6, the network interface 608 may be in communication with a user device 603 via the network 636, such as the Internet. In particular, the computing system 602 may establish a communication link 642 with a network 636 (e.g., using known protocols) in order to send communications to the computing device 603 over the network 636. Similarly, the computing device 603 may send communications to the computing system 602 over the network 636 via a wired or wireless communication link 640.

Those skilled in the art will recognize that the computing system 602 and user computing device 603 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:

memory; and at least one computing device configured with computer-executable instructions that, when executed, cause the at least one computing device to:

receive, from a user computing device via user interaction with a user interface (UI), a prompt as natural language text input;

generate, via a large language model (LLM), a response based on the prompt, wherein the response comprises text generated by the LLM;

send, to the user computing device, the response to be presented within the UI;

subsequent to presentation by the user computing device of the response within the UI, identify, based on the prompt and the response, a span of text within the response to perform a search associated with the span of text, wherein the span of text is determined by, subsequent to presentation of the response within the UI, a user of the user computing device selecting the span of text from the text of the response;

retrieve, from one or more data repositories, retrieval results using the span of text as a retrieval term, wherein the retrieval results each comprise a portion of text from information associated with the one or more data repositories that includes or relates to the span of text;

rank the retrieval results based at least in part on context determined from the prompt and the response generated by the LLM;

select one or more highest ranked retrieval results for presentation within the UI; and send, to the user computing device, the one or more highest ranked retrieval results to be displayed.

2. The system of claim 1, wherein the results are displayed for the user within the UI along with the prompt and the response.

3. The system of claim 1, wherein the UI is a first UI and the results are displayed for the user within a second UI separate from the first UI.

4. The system of claim 1, wherein the prompt is a question related to a product, the span relates to a specific feature of the product, and the one or more highest ranked retrieval results comprise portions of one or more of (a) an item listing from an electronic catalog, (b) a review of the product, (c) a question and answer page regarding the product, or seller information regarding a seller of the product.

5. A computer-implemented method comprising:
   receiving, from a computing device, a prompt as input to a generative artificial intelligence (AI) model;
   receiving, from the generative AI model, a response based on the prompt;
   sending the response to the computing device;
   subsequent to presentation by the computing device of the response within a user interface (UI), identifying, based on the prompt and the response, a span of text within the response to perform a search associated with the span of text, wherein the span of text is determined by, subsequent to presentation of the response within the UI, a user of the computing device selecting the span of text from the response;
   performing a retrieval of one or more data repositories to identify content related to the span of text, wherein retrieval results are selected based at least in part on context determined from text of the prompt and text of the response; and
   sending, to the computing device, the retrieval results to be displayed.

6. The computer-implemented method of claim 5, wherein the span of text is automatically identified based in part by performing Term Frequency Inverse Document Frequency (TF-IDF) analysis using frequency of words from the response relative to word frequency in a large set of responses previously generated by the generative AI model.

7. The computer-implemented method of claim 5, wherein the span of text is automatically identified by determining that the span of text was below a confidence score threshold, wherein a confidence score associated with the span of text was generated by the generative AI model.

8. The computer-implemented method of claim 5, wherein the span of text is automatically identified by determining that the generative AI model flagged the span of text for verification.

9. The computer-implemented method of claim 5, wherein the span of text is automatically identified by identifying patterns of prior prompts, responses, and manually selected spans of text using a training dataset.

10. The computer-implemented method of claim 5, wherein the context is determined by performing Term Frequency Inverse Document Frequency (TF-IDF) analysis to identify relevant contextual text from within the prompt and response.

11. The computer-implemented method of claim 5, further comprising:
   automatically identifying the span of text and prior to retrieving the results;

receiving, from the computing device, a modified version of the span of text manually modified by a user of the computing device after automatically identifying the span of text; and
   updating the span of text to the modified span of text.

12. The computer-implemented method of claim 5, wherein the retrieval is performed by:
   assigning embeddings to the span of text and context with weights, wherein the span of text is weighted more than the context; and
   using the weighted embedding to perform a search.

13. The computer-implemented method of claim 5, wherein the results are displayed for the user within a first UI along with the prompt and the response.

14. The computer-implemented method of claim 13, wherein the results are displayed for the user within a second UI separate from the first UI.

15. One or more non-transitory computer-readable media comprising computer-executed instructions that, when executed by a computing system, cause the computing system to:
   receive, from a computing device, a prompt as input to a generative artificial intelligence (AI) model;
   receive, from the generative AI model, a response based on the prompt;
   send the response to the computing device;
   subsequent to presentation by the computing device of the response within a user interface (UI), identify, based on the prompt and the response, a span of text within the response to perform a search associated with the span of text, wherein the span of text is determined by, subsequent to presentation of the response within the UI, a user of the computing device selecting the span of text from the text of the response;
   perform a retrieval of one or more data repositories to identify content related to the span of text, wherein retrieval results are selected based at least in part on context determined from text of the prompt and text of the response; and
   send, to the computing device, the retrieval results to be displayed.

16. The one or more non-transitory computer-readable media of claim 15, wherein the context is determined by performing Term Frequency Inverse Document Frequency (TF-IDF) analysis to identify relevant contextual text from within the prompt and response.

17. The one or more non-transitory computer-readable media of claim 15, wherein the retrieval is performed at least in part by:
   generating one or more embeddings representing (a) the span of text and (b) other text from the response and prompt, wherein the span of text is weighted more than the other text; and
   using the one or more embeddings as input to perform the retrieval.

18. The one or more non-transitory computer-readable media of claim 15, wherein the span of text is automatically identified based in part by performing Term Frequency Inverse Document Frequency (TF-IDF) analysis using frequency of words from the response relative to word frequency in a large set of responses previously generated by the generative AI model.

19. The one or more non-transitory computer-readable media of claim 15, wherein the span of text is automatically identified by determining that the span of text was below a confidence score threshold, wherein a confidence score associated with the span of text was generated by the generative AI model.

20. The one or more non-transitory computer-readable media of claim 15, wherein the results are displayed for a user of the computing device within a single user interface (UI) along with the prompt and the response.

* * * * *